United States Patent [19]

Shirakawa

[11] Patent Number: 5,388,977
[45] Date of Patent: Feb. 14, 1995

[54] CLAMPING DEVICE FOR A BLOW MOULDING MACHINE

[75] Inventor: Tsutomu Shirakawa, Kobe, Japan

[73] Assignee: Kabushiki Kaisha Kosmek, Hyogo, Japan

[21] Appl. No.: 121,867

[22] Filed: Sep. 17, 1993

[30] Foreign Application Priority Data

Sep. 18, 1992 [JP] Japan .................................. 4-275386

[51] Int. Cl.⁶ ............................................. B29C 45/10
[52] U.S. Cl. .................. 425/190; 425/192 R; 425/539
[58] Field of Search ................... 425/190, 192 R, 539

[56] References Cited

U.S. PATENT DOCUMENTS

| | | |
|---|---|---|
| 4,652,410 | 3/1987 | Inoue et al. .................. 425/190 |
| 4,948,105 | 8/1990 | Yonezawa . |
| 5,147,091 | 9/1992 | Yonezawa et al. . |
| 5,174,554 | 12/1992 | Yonezawa . |

FOREIGN PATENT DOCUMENTS

210839 12/1982 Japan .................................. 425/190

*Primary Examiner*—Tim Heitbrink
*Attorney, Agent, or Firm*—Bacon & Thomas

[57] ABSTRACT

An annular block (3) and an annular housing (23) are arranged in a lower portion of a head unit (1). A plurality of cylinder bores (27) are arranged within the housing (23) in along its outer periphery. The cylinder bores (27) are opened inwardly and acclivously in an inner peripheral surface (26) of the housing (23). At the time of clamping actuation, pistons (28) inserted into the respective cylinder bores (27) are adapted to be advanced inwardly and acclivously. Thereupon, a flange (15) provided in the upper portion of a die (5) is pressed to a bottom surface of a receiving hole (14) provided in the block (3) by clamping members (42) of the pistons (28).

5 Claims, 6 Drawing Sheets

CLAMPING DEVICE FOR A BLOW MOULDING MACHINE

BACKGROUND OF THE INVENTION

1. Field of the Invention

The present invention relates to a device adapted to detachably clamp a die to a lower portion of a head unit of a blow moulding machine.

2. Description of the Prior Art

The inventor of the present invention knows the following prior art.

Figure 8:
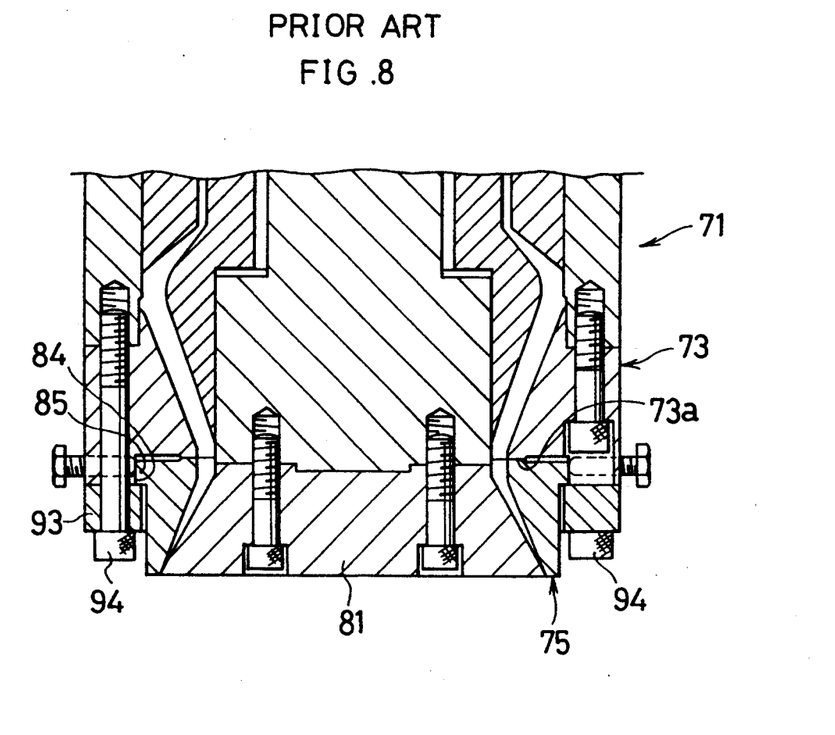
FIG. 8 shows a conventional embodiment and is a view corresponding to FIG. 1.

As shown in FIG. 8, an annular mounting block 73 is connected to a lower portion of a head unit 71 of a blow moulding machine and a receiving hole 84 is formed in a lower surface 73a of the block 73. A flange 85 provided in an upper portion of a die 75 is adapted to be snugly inserted into the receiving hole 84 from below. The flange 85 is fixedly secured to the block 73 by means of an annular pressing flange 93 and pressing bolts 94.

Generally, metal mould sets comprising the die 75 and mandrels 81 are replaced two or three times a day.

In the above-mentioned conventional construction, when the die 75 is replaced many pressing bolts 94 and the pressing flange 93 of a large diameter must be removed and then replaced again. Therefore, replacing the die is difficult. In the case of a large blow moulding machine, since the pressing flange 93 is large and heavy, a loading and unloading machine such as a forklift, a crane or the like is needed for handling the pressing flange 93. Accordingly, handling the pressing flange is very difficult.

SUMMARY OF THE INVENTION

An object of the present invention is to enable replacing a die in a blow moulding machine to be readily carried out.

For accomplishing the above-mentioned object, for example as shown in FIGS. 1 through 4, a clamping device is constructed as follows.

An annular mounting block 3 is connected to a lower portion of a head unit 1 of a blow moulding machine and a receiving hole 14 is formed in a lower surface 3a of the block 3. A flange 15 provided in the upper portion of a die 5 is adapted to be snugly inserted into the receiving hole 14 from below. A plurality of fluid pressure cylinders 21 are arranged along the other periphery of the annular block 3 and a housing 23 of the fluid pressure cylinders 21 is fixedly secured to the block 3. Each fluid pressure cylinder 21 comprises a cylinder bore 27 formed in the housing 23 and a piston 28 inserted slidably within the cylinder bore 27. Clamping members 42 connected to the piston 28 are adapted to be moved by means of the pistons 28 between a clamping position X where they advance radially inwardly beyond an outer peripheral surface of the flange 15 so as to engaged both the lower surface 3a of the block 3 and a lower surface 15a of the flange 15 from below and an unclamping position Y where they retreat radially outwardly beyond the outer peripheral surface of the flange 15 so as to disengage both the lower surface 3a of the block 3 and the lower surface 15a of the flange 15.

Figure 1:
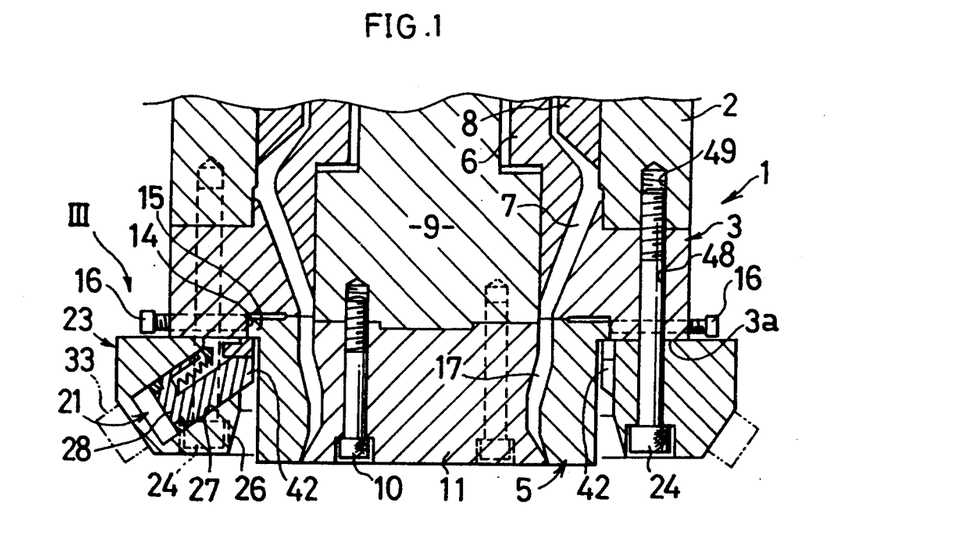
FIG. 1 is a sectional view of a clamping device taken along the I—I directed line in FIG. 2
Figure 2:
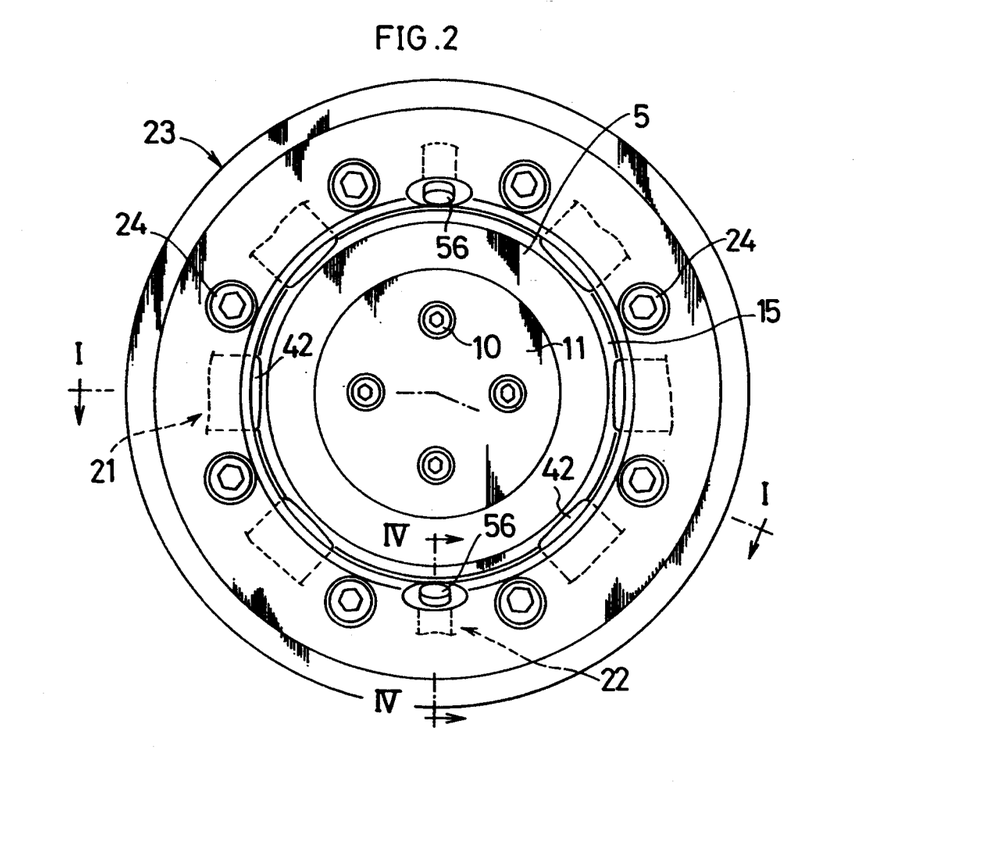
FIG. 2 is a bottom view of the clamping device.
Figure 3:
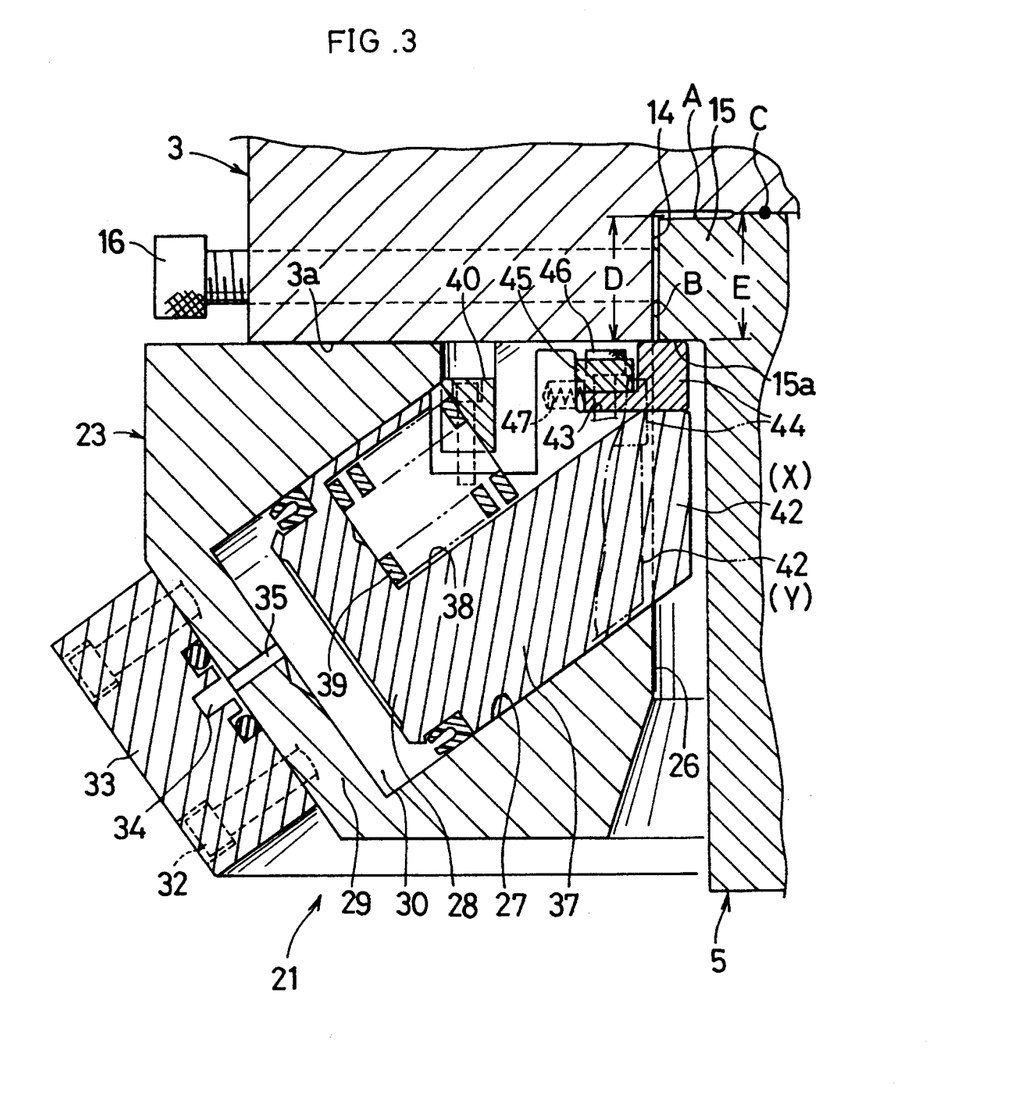
FIG. 3 is a detailed view of a portion indicated by the arrow III in FIG. 1

The present invention functions as follows, for example as shown in FIGS. 1 through 3.

The housing 23 is always fixedly secured to the mounting block 3 by means of, for example a plurality of bolts 24.

At the time of clamping actuation, as indicated by a figure depicted by a solid line in FIG. 3, the clamping members 42 are advanced to the clamping position X by means of the pistons 28 of the fluid pressure cylinders 21, so that the flange 15 of the die 5 is fixedly pressed to a bottom surface of the receiving hole 14 of the block 3.

At the time of unclamping actuation, as indicated by a figure depicted by a dashed line in FIG. 3, the clamping members 42 are retreated to the unclamping position Y by means of the pistons 28. Thereupon, the pressed condition of the flange 15 is cancelled, so that it becomes possible to dismount the die 15 from the receiving hole 14.

Since the present invention is constructed and functions as mentioned above, the following advantages can be attained.

At the time of replacing of the die, since it becomes possible to mount and dismount the die relative to the block by merely moving the clamping members by means of the fluid pressure cylinders, the pressing flange and the pressing bolts employed in the prior construction (refer to FIG. 8) can be omitted. Accordingly, the die replacing operation becomes easy and the replacing time can be shortened remarkably.

Incidentally, when the above-mentioned housing is formed in an annular configuration and a plurality of fluid pressure cylinders are arranged in the annular housing, it is possible to make use of existing bolt holes of the head unit for fixing the housing to the lower portion of the head unit. Therefore, it is easy to to apply the present invention to the conventional blow moulding machines.

Further, when other pushing-down fluid pressure cylinders are connected to the housing, since it becomes possible to forcibly remove the die from the block, the replacing operation becomes easier.

BRIEF DESCRIPTION OF THE DRAWINGS

The above and other objects, advantages and features of the invention will be become apparent when considered with the following detailed description and accompanying drawings wherein:

FIGS. 1 through 4 show a first embodiment of the present invention;

FIGS. 6(a) and 6(b) show a second embodiment of the clamping device of the present invention;

FIGS. 7(a) and 7(b) show a third embodiment of the clamping device of the present invention;

DESCRIPTION OF THE PREFERRED EMBODIMENTS

<First Embodiment>

FIGS. 1 through 4 show a first embodiment of the present invention.

A head unit 1 of a blow moulding machine is provided with an external cylinder 2 extending vertically, an annular mounting block 3 fixedly secured to a lower end of the external cylinder 2, a die 5 detachably secured to a lower surface 3a of the block 3, an internal cylinder 6 inserted into the external cylinder 2, a molten resin flow passage 7 formed between both these cylinders 2, 6, a squeezing piston 8 inserted into the flow passage 7, a vertically movable rod 9 inserted into the internal cylinder 6 and a mandrel 11 fixedly secured to the lower surface of the vertically movable rod 9 by means of a plurality of bolts 10.

A receiving hole 14 is formed concavely in the lower surface 3a of the block 3. A flange 15 provided in the upper portion of the die 5 is snugly inserted into the hole 14 from below. A plurality of horizontal bolts 16 are threadably engaged with the lower portion of the block 3 so that leading ends of the bolts 16 can be brought into contact with the peripheral surface of the flange 15. A clearance at a lower end of a squeeze passage 17 formed between the die 5 and the mandrel 11 is adapted to be adjusted by finely adjusting advancing and retreating distances of the horizontal bolts 16 and finely adjusting a rising and lowering distance of the vertically movable rod 9.

There are provided six sets of first hydraulic cylinders 21 for clamping and two sets of second hydraulic cylinders 22 for pushing-down along the outer periphery of the block 3. A housing 23 for these cylinders 21, 22 is formed in an annular configuration and fixedly secured to the lower surface 3a of the block 3 by means of eight through-bolts 24.

Firstly, the first hydraulic cylinder 21 will be explained hereinafter.

A plurality of cylinder bores 27 (herein, only one is shown) are opened inwardly and acclivously in the inner peripheral surface 26 of the annular housing 23 and a piston 28 is inserted into each cylinder bore 27. An actuating chamber 30 is formed between the piston 28 and a bottom wall 29 of the cylinder bore 27. An annular manifold 33 is hermetically secured to an outer peripheral surface of the housing 23 by means of many bolts 32. An oil supply-discharge groove 34 provided within the manifold 33 and the actuating chamber 30 are communicate with each other through a communication passage 35 formed in the bottom wall 29.

A piston rod 37 projects from the piston 28 inwardly and acclivously. A spring mounting hole 38 is formed in an upper half portion of the piston rod 37 parallel to the cylinder axis. An upper end of a return spring 39 mounted to the hole 38 is received by a spring retainer 40 which is fixed to the housing 23 by means of screws. A clamping member 42 is formed integrally with an upper portion of the piston rod 37. A horizontal pressing surface 43 is formed in the clamping member 42. A slide member 44 is supported horizontally movably by the pressing surface 43 through a support plate 45 and a bolt 46 and resiliently urged toward the die 5 by means of a compression spring 47.

At the time of clamping actuation, pressurized oil is supplied to the actuation chamber 30 so as to advance the piston 28 inwardly and acclivously. Thereupon, firstly the slide member 44 and the clamping member 42 advance radially inwardly beyond the outer peripheral surface of the flange 15, so that the slide member 44 is brought into contact with the lower surface 3a of the block 3 and the lower surface 15a of the flange 15 from below and is frictionally fixed by them. Subsequently, the clamping member 42 is advanced a little inwardly and acclivously relative to the frictionally fixed slide member 44 so that the flange 15 is pressed to the block 3 by means of the clamping member 42 in the clamping position X. Incidentally, in FIG. 3, the symbol A designates a clearance for pressing and the symbol B designates an adjusting clearance in the radial direction.

As mentioned above, since both the lower surface 3a of the block 3 and the lower surface 15a of the flange 15 are pressed simultaneously, the upper surface of the die 5 can be suitably pressed to the bottom surface of the receiving hole 14. The symbol C designates a contact portion. Therefore, to prevent the molten resin within the flow passage 7 (refer to FIG. 1) from leaking from the contact portion C the die 5 can be radially adjusted by means of the horizontal bolts 16. Incidentally, a depth D of the receiving hole 14 and a height E of the flange 15 may be set to the nearly same value.

At the time of unclamping actuation, the pressurized oil is discharged from the actuating chamber 30 so as to make the piston 28 retreat outwardly and declivously by means of the return spring 39. Thereupon, a sliding is caused between the lower surface of the frictionally fixed slide member 44 and the pressing surface 43 of the clamping member 42, so that only the clamping member 42 retreats leaving the slide member 44 behind. The slide member 44 is also retreated by means of the subsequently retreating clamping member 42, so that these members 42, 44 are retreated radially outwardly beyond the outer peripheral surface of the flange 15 (refer to a figure depicted by the dashed line). Thereby, the die 5 is removable from the block 3.

Figure 4:
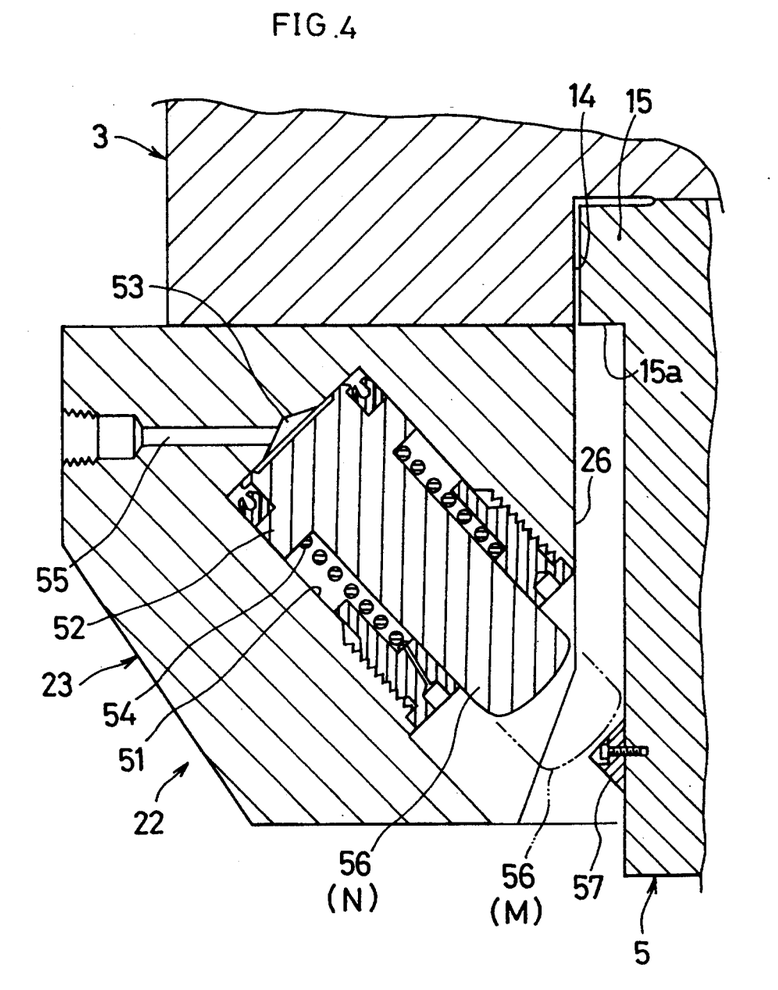
FIG. 4 is a sectional view taken along the directed line IV—IV in FIG. 2.

The second hydraulic cylinder 22 for forcibly performing the removing operation is constructed as follows, as mainly shown in FIG. 4.

A second cylinder bore 51 is opened inwardly and declivously in the inner peripheral surface 26 of the annular housing 23 so that a second piston 52 is inserted into the second cylinder bore 51. A second actuating chamber 53 is formed above the piston 52 and a second return spring 54 is mounted below the piston 52.

When the pressurized oil is supplied from an oil supply and discharge passage 55 to the second actuating chamber 53, as indicated by the figure depicted by the dashed line, a push-down member 56 connected to the lower portion of the second piston 52 is moved to an advancing position M so that the push-down member 56 pushes down a receiving member 57 fixed by a screw to the peripheral surface of the die 5 to forcibly remove the die 5 from the block 3.

After that, when the pressurized oil is discharged from the second actuating chamber 53, as indicated by the figure depicted by the solid line, the push-down member 56 is moved to a retreating position N so as to retreat radially outwardly beyond the outer peripheral surface of the flange 15. Thereby, the flange 15 of the die 5 is allowed to lower.

The following advantages can be provided by the above-mentioned embodiment.

When the housing 23 is fixedly secured to the block 3 by means of the through-bolts 24, existing holes provided in the block 3 and the external cylinder 2 respectively can be utilized as through-holes 48 and threaded holes 49 for the through-bolts 24. Therefore, it becomes easy to attach the housing 23 to the lower portion of the head unit 1.

Since the pressurized oil is adapted to be supplied to and discharged from the plurality of actuating chambers 30 through the annular manifold 33, it becomes possible to simplify the hydraulic piping.

Figure 5:
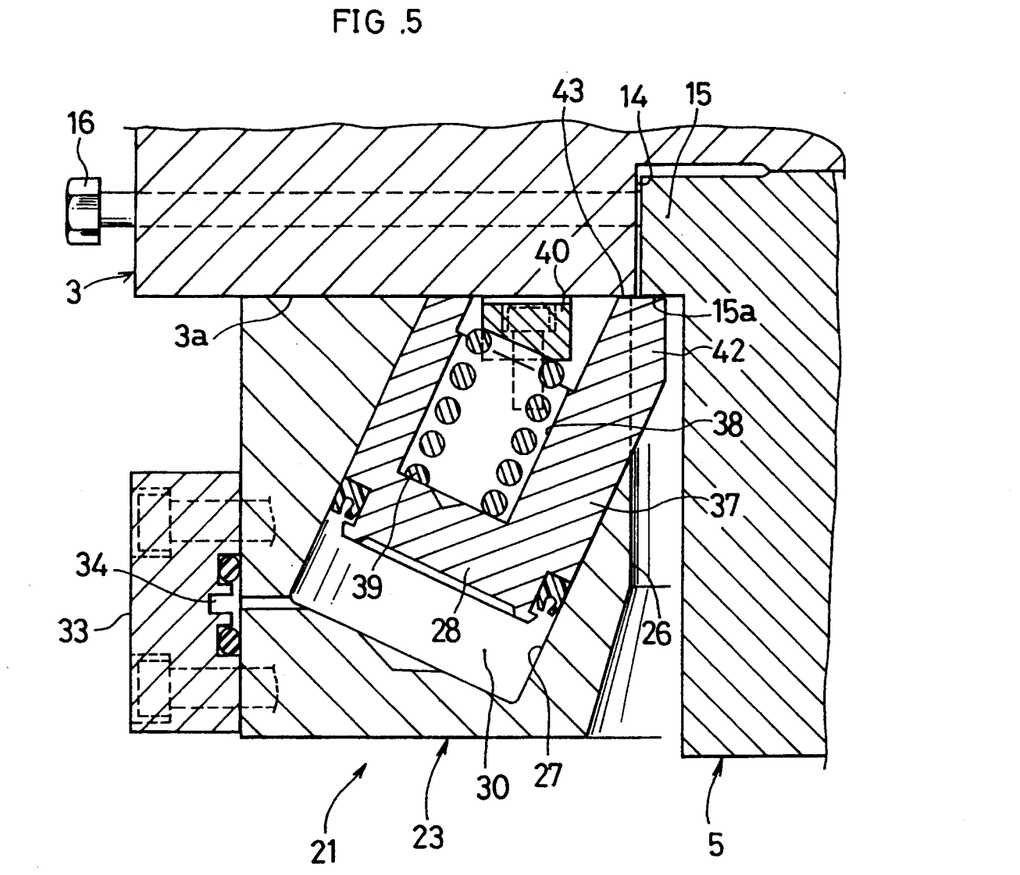
FIG. 5 shows a variant example of the clamping device and is a view corresponding to FIG. 3.

FIG. 5 shows a variant example of the first hydraulic cylinder 21 and is a view corresponding to FIG. 3. In this variant example, component members having the same constructions as those in the above-mentioned embodiment are designated by the same symbols.

In this variant example, an inclination angle of the cylinder bore 27 relative to the lower surface 3a of the block 3 is set larger. Thereby, the annular housing 23 and the manifold 33 are restrained from projecting beyond the outer peripheral surface of the block 3. Further, the pressing surface 43 of the clamping member 42 is adapted to be brought into direct contact with the lower surface 3a of the block 3 and the lower surface 15a of the flange 15.

The above-mentioned embodiment may be modified as follows.

The respective fluid pressure cylinders 21, 22 may be pneumatic cylinders instead of the hydraulic cylinders. Further, the respective fluid pressure cylinders may be advanced by means of a spring force instead of being retreated by the spring force, or may be a double acting type cylinder.

The fitting construction between the die 5 and the mandrel 11 and the attachment construction between the mandrel 11 and the vertically movable rod 9 are not limited to the above-mentioned embodiment but may be varied according to the kinds of moulding workings.

Figure 6A:
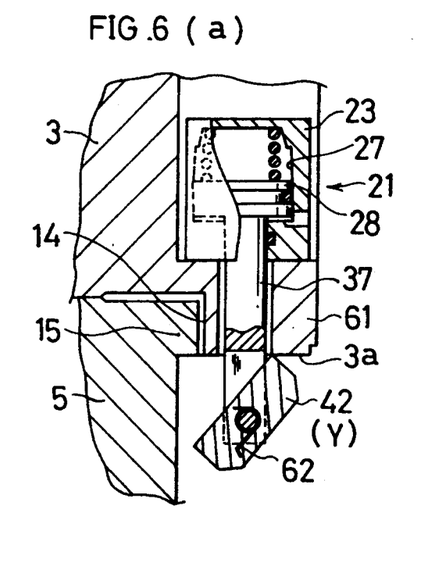
FIG. 6(a) shows an unclamping condition.
Figure 6B:
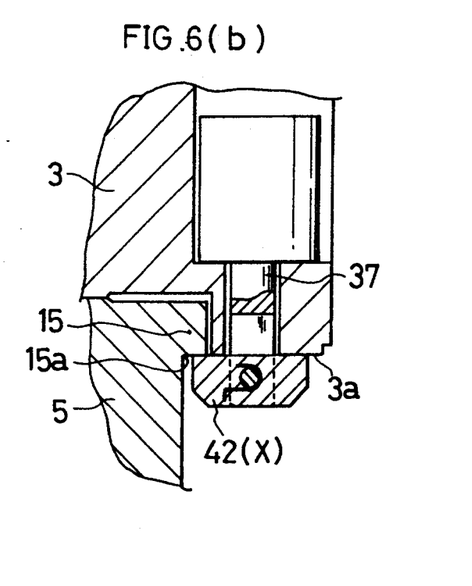
FIG. 6(b) shows a clamping condition.
Figure 7A:
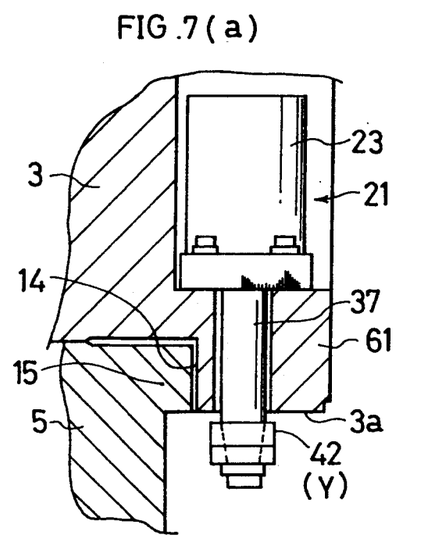
FIG. 7(a) shows an unclamping condition.
Figure 7B:
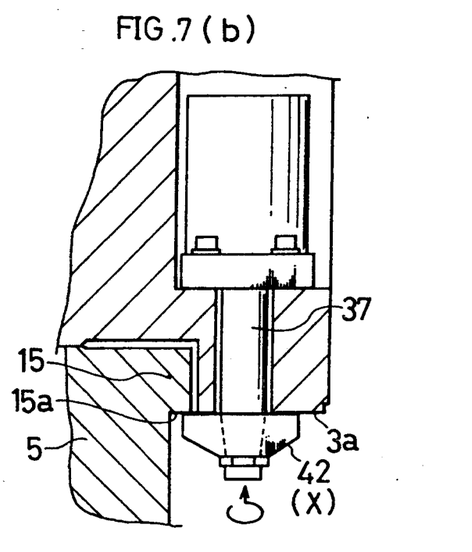
FIG. 7(b) shows a clamping condition.

FIGS. 6 and 7 show a second and a third embodiment of the present invention. In these embodiments, component members having the same construction as those in the first embodiment are designated by the same symbol.

<Second Embodiment>

As shown in FIG. 6, there are provided a plurality of housings 23 (herein, only one is shown) along the outer periphery of the annular block 3 and the respective housings 23 are fixedly secured to the upper surface of the flange 61 of the block 3.

In the unclamped condition as shown in FIG. 6(a), the piston 28 within the cylinder bore 27 is lowered, so that the clamping member 42 swingably supported by the lower portion of the piston rod 37 is changed over to the unclamping position Y by means of a torsion spring 62.

When the piston 28 is raised, as shown in the clamped condition of FIG. 6(b), the clamping member 42 swings to the clamping position X so that the clamping member 42 presses the lower surface 3a of the block 3 and the lower surface 15a of the flange.

<Third Embodiment>

As shown in FIG. 7, this third embodiment has the clamping member 42 of the pivotable and vertically movable type and other constructions similar to those in the second embodiment.

In the unclamped condition shown in FIG. 7(a), by lowering the piston (not illustrated), the piston rod 37 is lowered and the clamping member 42 is pivoted to the clamping position Y.

When the piston is raised, as shown in the clamped condition of FIG. 7(b), firstly the piston rod 37 and the clamping member 42 are pivoted by a pivoting mechanism (not illustrated) within the housing 23 and then both these 37, 42 are raised so that the clamping member 42 is moved to the clamping position X.

Thereby, the clamping member 42 presses the lower surface 3a of the block 3 and the lower surface 15a of the flange 15.

As many different embodiments of the invention will be obvious to those skilled in the art, some of which have been disclosed or referred to herein, it is to be understood that the specific embodiments of the invention as presented herein are intended to be by way of illustration only and are not limiting on the invention, and it is to be understood that such embodiments, changes, or modifications may be made without departing from the spirit and scope of the invention as set forth in the claims appended hereto.

What is claimed is:

1. A clamping device for a blow moulding machine comprising:

an annular mounting block (3) having a lower surface (3a) connected to a lower portion of a head unit (1) of the blow moulding machine;

a receiving hole (14) provided in the lower surface (3a) of the annular mounting block (3) and adapted to snugly receive a flange (15) provided in an upper portion of a die (5), the flange (15) having a lower surface (15a) and an outer peripheral surface;

a plurality of fluid pressure cylinders (21) arranged along the outer periphery of the block (3), each cylinder having a housing (23) fixedly secured to the block (3), and provided with a cyclinder bore (27); and clamping members (42) connected to the pistons (28) and adapted to be moved by the pistons (28) between a clamping position (X) where said clamping members (42) advance radially inwardly beyond the outer peripheral surface of the flange (15) so as to face both the lower surface (3a) of the annular mounting block (3) and the lower surface (15a) of the flange (15) and an unclamping position (Y) where said clamping members (42) retreat radially outwardly beyond the outer peripheral surface of the flange (15).

2. A clamping device as set forth in claim 1, wherein the housing (23) is formed in an annular configuration and fixedly secured to the lower surface (3a) of the block (3), and the cylinder bores (27) are opened inwardly acclivously in an inner peripheral surface (26) of the annular housing (23), and the clamping members (42) are fixedly secured to the upper portions of the pistons (28).

3. A clamping device as set forth in claim 2, wherein other cylinder bores (51) are opened inwardly declivously in the inner peripheral surface (26) of the annular housing (23) other pistons (52) are inserted into said other cylinder bores (51), and push-down members (56) connected to the lower portions of the other pistons (52) are adapted to be moved by said other pistons (52) between an advancing position (M) where said push-down members (56) are brought into contact with a peripheral surface of the die (5) and a retreating position (N) where said push-down members (56) retreat radially outwardly beyond the outer peripheral surface of the flange (15).

4. A clamping device as set forth in claim 2, wherein the plurality of fluid pressure cylinders (21) are single-acting and spring biased to a returned position and actuating chambers (30) of these fluid pressure cylinders (21) are communicated with one another through an annular manifold (33).

5. A clamping device as set forth in claim 4, wherein the annular manifold (33) is hermetically secured to the housing (23).

* * * * *